(12) United States Patent
Nyman et al.

(10) Patent No.: US 6,864,986 B2
(45) Date of Patent: Mar. 8, 2005

(54) MIXING METHOD AND APPARATUS FOR CHARACTERIZING OPTICAL MODULATOR

(75) Inventors: Bruce Nyman, Freehold, NJ (US); Gregory J. McBrien, Glastonbury, CT (US)

(73) Assignee: JDS Uniphase Corporation, San Jose, CA (US)

( * ) Notice: Subject to any disclaimer, the term of this patent is extended or adjusted under 35 U.S.C. 154(b) by 477 days.

(21) Appl. No.: 10/160,983

(22) Filed: May 31, 2002

(65) Prior Publication Data

US 2002/0196444 A1 Dec. 26, 2002

Related U.S. Application Data

(60) Provisional application No. 60/294,567, filed on Jun. 1, 2001.

(51) Int. Cl.[7] ................................................. G01B 9/02
(52) U.S. Cl. ....................... 356/484; 356/73.1; 356/432
(58) Field of Search ................................ 356/484, 477, 356/432, 73.1, 450, 451

(56) References Cited

U.S. PATENT DOCUMENTS 6,317,214 B1 * 11/2001 Beckett et al. .............. 356/450
6,323,950 B1 * 11/2001 Kim et al. .................. 356/73.1
6,559,946 B2 *  5/2003 Davidson et al. ........... 356/450

* cited by examiner

*Primary Examiner*—Samuel A. Turner
(74) *Attorney, Agent, or Firm*—Allen, Dyer, Doppelt, Milbrath & Gilchrist, P.A.

(57) ABSTRACT

A mixed frequency-based method and arrangement for characterizing an electro-optic modulator is configured to vary the tuning of a laser beam, to be modulated by the optical modulator, simultaneously with and in the same manner as the variation in frequency of the modulation signal. The effect of this dual modulation approach is a modulated laser beam, in which the frequency difference between the carrier component of the laser beam and sideband energy produced by the modulation signal is controlled so that it falls within the sensitivity range of a relatively low cost optical detector.

17 Claims, 1 Drawing Sheet

MIXING METHOD AND APPARATUS FOR CHARACTERIZING OPTICAL MODULATOR

CROSS-REFERENCE TO RELATED APPLICATION

The present application claims the benefit of co-pending U.S. Provisional Patent Application Ser. No. 60/294,567, filed Jun. 1, 2001, by B. Nyman et al, entitled: "Method for Characterizing Optical Modulators," assigned to the assignee of the present application and the disclosure of which is incorporated herein.

FIELD OF THE INVENTION

The present invention relates in general to optical communication systems and component therefor, and is particularly directed to a new and improved method and arrangement for characterizing or testing the operation/performance of an electro-optic modulator of the type used to modulate a laser beam with a very high frequency information signal (e.g., a digital information signal having a data rate on the order of 40 Gbps or higher).

BACKGROUND OF THE INVENTION

Conventional techniques for characterizing electro-optic devices, particularly electro-optic modulators of the type used in digital optical communication systems, employ an opto-electronic detection subsystem having a bandwidth larger than highest modulation frequency to be measured. For characterizing a 40 Gb/s or high device, such a detection subsystem is expensive and difficult to calibrate.

SUMMARY OF THE INVENTION

In accordance with the present invention, these high cost and complex calibration shortcomings of conventional optical modulator characterization schemes are effectively obviated by a mixed frequency-based modulator testing arrangement that is configured to vary the tuning of a laser beam, to be modulated by the optical modulator, simultaneously with and in the same manner as the variation in frequency of the modulation signal. The effect of this dual modulation approach is a modulated laser beam, in which the frequency difference between the carrier component of the laser beam and sideband energy produced by the modulation signal is kept constant.

In a first, sideband-filtering, embodiment, an electro-optic laser modulator, such as an X-cut lithium niobate (LN) Mach Zehnder (MZ) modulator, is installed in the output beam path of a tunable, continuous wave laser producing a very narrow line width laser carrier frequency (e.g., tunable on the order of 500 THz and a line width less than 100 kHz). The laser modulator is coupled to receive a variable frequency RF drive signal from a frequency synthesizer or network analyzer. Under control of a supervisory controller, the synthesizer's output drive signal to the modulator is varied, or swept, over a prescribed frequency range, such as, but not limited to a range on the order of from 100 kHz to 50 GHz.

The supervisory controller synchronizes a laser tuning control signal with the sweeping of the RF modulation frequency of the drive signal, so that the frequencies of these two signals are effectively swept together and by the same amounts. As a result, the optical output of the modulator will contain the laser's carrier component, as well as modulation sideband energy. Although the absolute frequency of the sideband energy will depend on the (carrier) wavelength to which the laser is tuned, the frequency difference between the sideband energy and the carrier will fall within the relatively narrowband window over which the modulation frequency is varied (e.g., 100 kHz to 50 GHz), as the laser's output frequency is simultaneously tuned to track the frequency variation in the modulator's drive input.

The modulated laser beam is optically filtered by a relatively narrowband bandpass optical filter that rejects the optical carrier frequency to which the laser is tuned, and passes only frequencies lying in the range of sideband variation produced by the modulator and falling within the sensitivity range of a relatively low cost optical detector, that measures average power (such as, but not limited to a diode detector). In addition to its frequency response, the phase response of the optical modulator may be measured, by amplitude modulating the laser beam produced by the tunable laser with a relatively low frequency (sinusoidal) signal, that falls within the bandpass of the passband filter, and measuring the change in phase of this low frequency sinusoid in the course of the frequency sweep of the optical modulator.

For this purpose, a sinusoid signal generator, such as one contained within a lock-in amplifier, may supply a relatively low frequency (e.g., on the order 100 MHz) amplitude drive control signal to the tunable laser. As the frequency of the modulator drive signal is varied, any change in the amplitude of the energy measured by the optical detector will be associated with a variation in phase of the laser beam's low frequency amplitude drive signal. This phase change is readily detected by coupling the output of the optical detector to a phase detector within the lock-in amplifier that is referenced to the amplitude modulation drive sinusoid.

In a second, optical heterodyne embodiment, rather than install a bandpass optical filter in the output path of the modulator ahead of the opto-electronic detector, the output of a second or auxiliary laser is directed upon the same optical aperture of the optical detector. This coincidence of the two laser beams on the optical detector creates a heterodyne effect, resulting in sum and difference optical beat frequencies being produced by the carrier frequency of the tunable laser and the carrier frequency of the second or auxiliary laser. The frequency of the second laser may be the same as or relatively close to the carrier frequency of the tunable laser, so that the difference beat frequency between the two lasers can be maintained relatively close to DC, and thereby identified and removed separately from the modulation in the detector output.

Like the first embodiment, the sensitivity range of the optical detector may correspond to the generally low frequency range of the modulation sweep signal, so that a relatively inexpensive optical detector (such as a diode detector), which measures average power, may be employed. Also, the tuning control signal supplied to the tunable laser is synchronized with the sweeping of the RF modulation frequency, so that the frequencies of the two signals are swept together and by the same amounts. The optical output of the modulator contains a component corresponding to the carrier frequency to which the tunable laser is tuned by the controller, as well as sideband frequency energy offset from this carrier based upon the output modulation frequency from the synthesizer.

Because the frequency difference between the sideband energy and the carrier produced by tunable laser falls within the tuning window over which the modulation frequency is varied (e.g., 100 kHz to 50 GHz), then in order to use a relatively inexpensive optical detector having a relatively low frequency sensitivity range, this carrier must be removed from the optical detector input. This is achieved in the second embodiment by optically heterodyning the carrier frequency produced by the tunable laser with the output beam frequency of the second laser at the optical sensitivity aperture of the detector.

DETAILED DESCRIPTION

Figure 1:
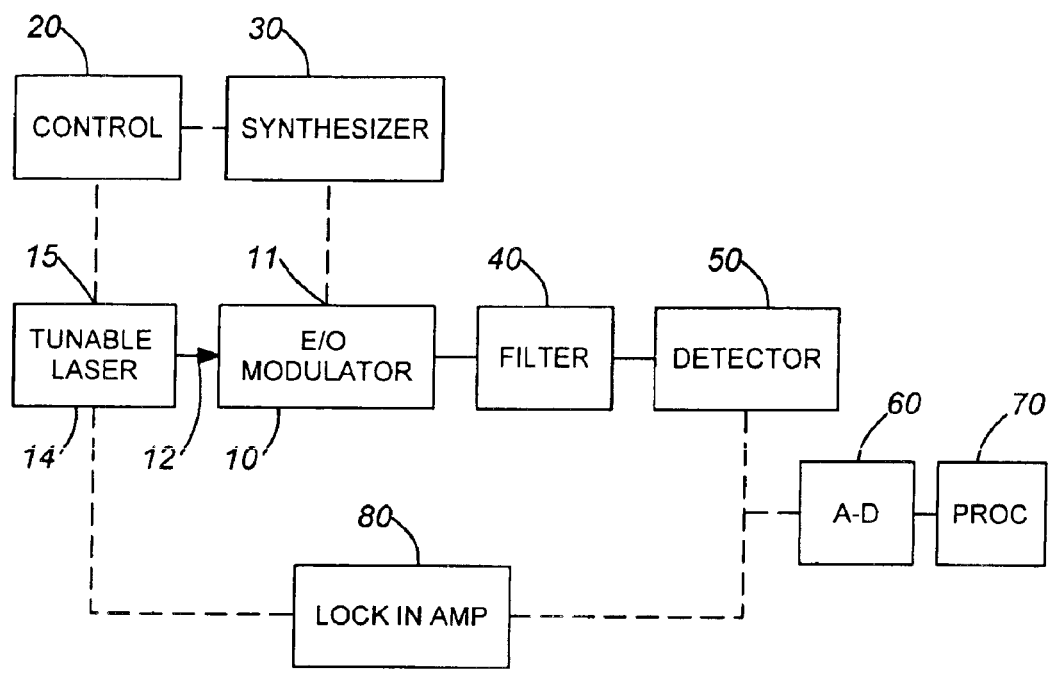
FIG. 1 diagrammatically illustrates the configuration of a first, sideband-filtering, embodiment of the optical modulator characterization arrangement of the invention.

Before describing in detail the new and improved frequency-mixing based, optical modulator measurement and analysis mechanism of the present invention, it should be observed that the invention resides primarily in prescribed modular arrangements of conventional optoelectronic, and electro-optic circuits and components and signal processing circuits coupled therewith. As a consequence, the configuration and manner of intercoupling such arrangements of circuits and components and their operation have, for the most part, been illustrated in the drawings by readily understandable block diagrams, showing only those specific details that are pertinent to the present invention, so as not to obscure the present disclosure with details which will be readily apparent to those skilled in the art having the benefit of the description herein. Thus, the diagrammatic illustrations are primarily intended to show the major components of non-limiting embodiments of the modulator characterization system of the invention in convenient functional groupings, whereby the present invention may be more readily understood.

The overall configuration of a first, sideband-filtering, embodiment of the frequency-mixing modulator characterization arrangement of the invention is shown diagrammatically in FIG. 1 as comprising an electro-optic laser modulator 10, such as an X-cut lithium niobate (LN) Mach Zehnder (MZ) modulator, as a non-limiting example, that is installed in the output beam path 12 of a tunable, continuous wave laser 14, such as decision feedback (DFB) laser. Laser 14 is operative to produce a very narrow laser output frequency (e.g., on the order of 500 THz and a line width less than 100 kHz).

In addition to having a DC bias port (not shown) to which a DC control voltage is applied under the control of a supervisory controller 20, LN MZ modulator 10 has a modulation drive port 11, to which a variable frequency RF drive signal is supplied from a modulation source 30 (such as a frequency synthesizer or network analyzer). Under control of the supervisory controller 20, the frequency of the synthesizer's output drive signal to modulator 10 may be varied or swept over a prescribed range, such as, but not limited to a range of from 100 kHz to 50 GHz.

The modulated laser beam produced at the output of modulator 10 is optically filtered by a relatively narrowband bandpass optical filter 40, that serves to reject optical energy within the optical carrier frequency to which the laser 14 is tuned and to transmit or pass only frequencies lying in the modulation sideband produced by the modulator 10. Thus, optical bandpass filter 40 has a passband that encompasses only the frequency range over which the modulation signal is varied or swept). As a non-limiting example, the bandpass filter 40 may comprise a high finesse Fabry-Perot filter.

After being filtered by the bandpass filter 40, the sideband modulation energy in the output beam from the modulator 10 is detected by an optical detector 50. Alternatively, other types of functionally equivalent, opto-electronic components, such as but not limited to an optical spectrum analyzer, or an RF spectrum analyzer, may be used.

The supervisory controller 20 is programmed to synchronize a tuning control signal supplied to a laser tuning port 15 of the laser 14 with the sweeping of the RF modulation frequency output by the signal driver 30, so that the frequencies of these two signals are effectively swept together and by the same amounts. As a result, the optical output of the modulator 10 will contain energy in the carrier component to which the laser 14 is tuned by the controller 20, as well as modulation sideband energy that is offset from this carrier based upon the output (modulation) frequency from synthesizer 30.

Namely, although the absolute frequency of the sideband energy will depend on the (carrier) wavelength to which the laser is tuned, the frequency difference between the sideband energy and this carrier will fall within the relatively narrow tuning window over which the modulation frequency is varied (e.g., 100 kHz to 50 GHz), as the laser's output frequency is simultaneously tuned to track the frequency variation in the modulator's drive input. The resulting output spectra within the sideband energy's sweep range will pass through the optical filter 40 (which rejects the carrier and transmits the sideband, as described above) and be detected by the optical detector 50. The output of the optical detector 50 may be digitized by an analog-to-digital (D-A) converter 60 for analysis by a processor 70.

In addition its frequency response, the phase response of the optical modulator 10 may be measured, by modulating the amplitude of the laser beam produced by the tunable laser 14 with a relatively low frequency (sinusoidal) signal, that falls within the bandpass of the filter 40, and measuring the change in phase of this low frequency sinusoid in the course of the frequency sweep of the modulator. For this purpose, a sinusoid signal generator, such as may be contained within a lock-in amplifier 80, may supply a relatively low frequency (e.g., on the order 100 MHz) amplitude drive control signal to the laser 14. Then, as the frequency of the modulator drive signal is varied, any change in the amplitude of the energy measured by the optical 50 will be associated with a variation in phase of the laser beams low frequency amplitude drive signal. This phase change is readily detected by coupling the output of the optical detector 50 to a phase detector within the lock-in amplifier that is referenced to the amplitude modulation drive sinusoid.

In addition to monitoring its optical output performance, electrical reflection parameters of the electro-optic modulator 10 may be readily measured by coupling an electrical tap to its modulation drive input 11.

Figure 2:
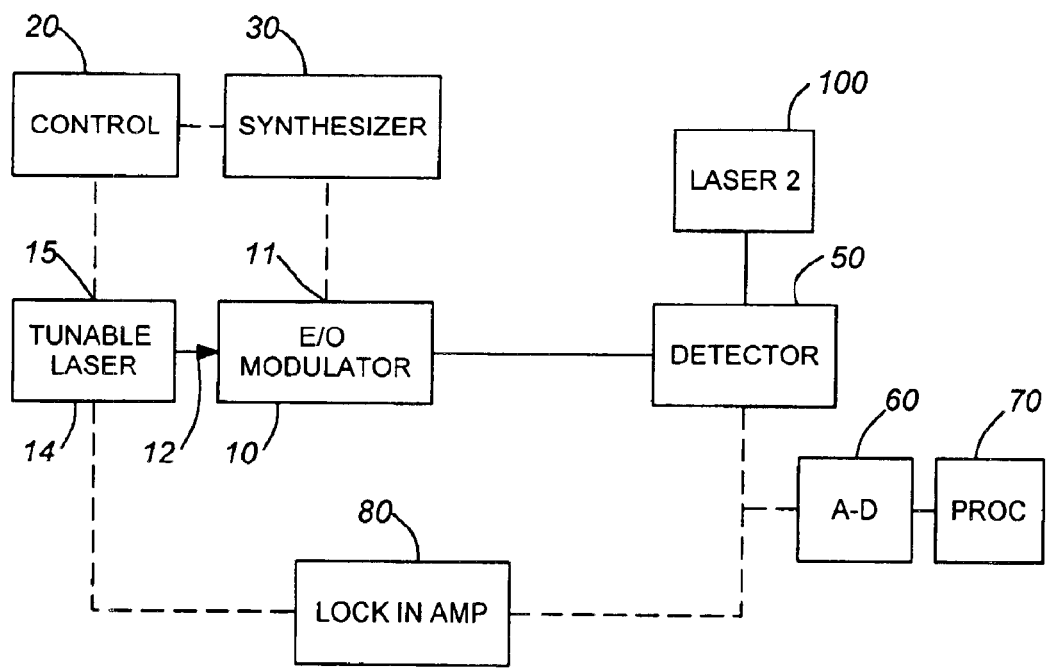
FIG. 2 illustrates a second, optical heterodyne embodiment of the optical modulator characterization arrangement of the invention.

FIG. 2 illustrates a second 'optical heterodyne' embodiment of the electro-optic modulator characterization arrangement of the invention. As in the first embodiment the laser modulator may comprise an electro-optic laser modulator 10, such as, but not limited to an X-cut lithium niobate (LN) Mach Zehnder (MZ) modulator, arranged in output beam path 12 of tunable, continuous wave laser 14, which has a very narrow carrier frequency (e.g., one on the order 200 THz with a line width less than 100 kHz). Also, as in the first embodiment, modulator 10 has its modulation drive port 11 coupled to receive a variable frequency RF drive signal supplied from a frequency synthesizer or network analyzer 30 as controlled by supervisory controller 20, which is operative to sweep the frequency of the drive signal to the modulator 10 over a prescribed range, such as from 100 kHz to 50 GHz, as in the first embodiment.

However, rather than being filtered by means of a relatively narrowband bandpass optical filter installed in the output path of the modulator 10, as in the first embodiment, the modulated beam output of modulator 10 in the embodiment of FIG. 2 is directly incident upon the optical aperture of the detector 50. In addition, a second laser 100 has its output beam coincidentally incident upon the same optical aperture of the optical detector 50. This may be effecting using a suitable coupler (not shown). This coincidence of the two laser beams on the beam receiving sensitivity region of the detector creates a heterodyne effect therebetween, resulting in sum and difference optical beat frequencies between the carrier frequency $f_{c14}$ of the tunable laser 14 and the carrier frequency $f_{c100}$ of the laser 100 at the optical detector's input aperture sensitivity region. The frequency $f_{c100}$ of the laser 100 may be the same as or relatively close to the carrier frequency $f_{c14}$ of the tunable laser 14 within its tunable range, so that the difference beat frequency between the two lasers can be maintained relatively close to DC, and thereby identified and removed separate from the modulation in the detector output.

As in the first embodiment, the sensitivity range of the optical detector 50 may correspond to the generally low frequency range of the modulation sweep signal, so that a relatively inexpensive optical detector such as a diode detector, which measures average power, may be employed. Again, functionally equivalent, opto-electronic components, such as but not limited to an optical spectrum analyzer, or an RF spectrum analyzer, may be used for the optical detector 50.

Also, as in the first embodiment, the supervisory controller 20 synchronizes the tuning control signal supplied to the laser tuning port 15 of tunable laser 14 with the sweeping of the RF modulation frequency, so that the frequencies of these two signals are swept together and by the same amounts. The optical output of the modulator 10 thus contains a component corresponding to the carrier frequency $f_{c14}$ to which the tunable laser 14 is tuned by the controller 20, as well as sideband frequency energy that is offset from this carrier based upon the output (modulation) frequency from the synthesizer 30.

Since the frequency difference between the sideband energy and the carrier $f_{c14}$ produced by tunable laser 14 falls within the tuning window over which the modulation frequency is varied (e.g., 100 kHz to 50 GHz), then in order to use a relatively inexpensive optical detector having a relatively low frequency sensitivity range, it is necessary to remove this carrier from the optical detector input. As pointed out above, this is accomplished in the second embodiment by optically heterodyning the carrier frequency $f_{c14}$ produced by tunable laser 14 with the output beam frequency $f_{c100}$ of the second laser 100 at the optical sensitivity aperture of the detector 50.

As in the first embodiment, the resulting narrowband output of detector 50 may be digitized by A-D converter 60 for analysis by processor 70. Also, the phase response of the modulator may be measured by imparting a relatively low frequency signal to the tunable laser 14 as by means of lock-in amplifier 80, the output of which is coupled to a low frequency modulator 90 to the laser's electrical input port, as described above. Likewise, electrical reflection parameters of the electro-optic modulator 10 of the embodiment of FIG. 2 may be readily measured by coupling an electrical tap to its modulation drive input 11. In addition, the tunable laser 14 may be swapped with the laser 100. This will allow testing to occur at a fixed wavelength.

As will be appreciated from the foregoing description, high cost and complex calibration shortcomings of conventional optical modulator characterization schemes are effectively obviated by a mixed frequency-based modulator testing arrangement that is configured to vary the tuning of a laser beam, to be modulated by the optical modulator, simultaneously with and in the same manner as the variation in frequency of the modulation signal. The effect of this dual modulation approach is a modulated laser beam, in which the frequency difference between the carrier component of the laser beam and sideband energy produced by the modulation signal is significantly reduced so that it falls within the sensitivity range of a relatively low cost optical detector.

While we have shown and described several embodiments in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed is:

1. A method of measuring the operation of an optical modulator comprising the steps of:
    (a) directing a light beam having a variable beam frequency upon said optical modulator;
    (b) causing said modulator to modulate said light beam with a modulation signal, and thereby produce a modulated light beam containing a carrier component corresponding to said variable beam frequency and a sideband component corresponding to the difference between the frequency of said carrier component and the frequency of said modulation signal;
    (c) simultaneously varying the frequency of said variable beam frequency light beam and the frequency of said modulation signal, in accordance with the same variation characteristic, so that said difference between the frequency of said carrier component and the frequency of said modulation signal varies in accordance with said same variation characteristic; and
    (d) detecting the variation in said difference between the frequency of said carrier component and the frequency of the modulation of said light beam resulting from step (c).

2. The method according to claim 1, wherein step (d) includes optically filtering said light beam resulting from step (c), to remove said carrier component and leave said difference between the frequency of said carrier component and the frequency of the modulation of said light beam, and optically detecting the resulting filtered modulated light beam.

3. The method according to claim 2, wherein step (d) includes optically filtering said light beam resulting from step (c) using a bandpass filter having a passband that encompasses the frequency range of said variation characteristic, but is less than the beam frequency of said light beam.

4. The method according to claim 1, wherein step (d) further includes the precursor step of optically heterodyning an auxiliary light beam with the modulated variable beam frequency light beam resulting from step (c), and detecting said variation in said difference between the frequency of said carrier component and the frequency of the modulation of said light beam.

5. The method according to claim 4, wherein step (a) comprises providing a first, tunable laser that is operative to generate a first laser beam having said variable beam frequency, and wherein step (d) includes providing a second laser that is operative to generate a second laser beam, and directing said second laser beam and the first laser beam modulated in step (c) upon an optical detector having a frequency sensitivity range that encompasses the frequency range of said variation characteristic, but is less than the beam frequency of said first laser beam, so as to optically heterodyne said second laser beam with said modulated first laser beam, whereby said optical detector produces an output representative of said variation in said difference between the frequency of said carrier component and the frequency of the modulation of said first laser light beam.

6. The method according to claim 1, wherein step (a) further includes modulating the amplitude of said light beam coupled to said modulator in accordance with a prescribed signal, and wherein step (d) includes generating an output representative of a difference between a parameter of said prescribed signal and energy contained in said variation in said difference between the frequency of said carrier component and the frequency of the modulation of said light beam resulting from step (c).

7. The method according to claim 1, wherein step (d) comprises detecting said variation in said difference between the frequency of said carrier component and the frequency of the modulation of said light beam, using an optical detector having a frequency sensitivity range that encompasses the frequency range of said variation characteristic, but is less than the beam frequency of said light beam.

8. An arrangement for measuring the operation of an optical modulator comprising:
    a tunable laser that is operative to output a first laser beam having a variable beam frequency, said first laser beam being directed upon said optical modulator for modulation thereby;
    an optical modulator controller that is operative to couple a modulation signal to said optical modulator and thereby cause said optical modulator to produce a modulated output beam containing a carrier component corresponding to said variable beam frequency, and a sideband component corresponding to the difference between the frequency of said carrier component and the frequency of said modulation signal, said optical modulator controller being further operative to vary said variable beam frequency of said tunable laser simultaneously with variation of said modulation signal, and in accordance with the same variation characteristic, so that said difference between the frequency of said carrier component and the frequency of said modulation signal varies in accordance with said same variation characteristic; and
    an optical detector that is coupled to receive said first laser beam as modulated by said optical modulator and is operative to detect the variation in said difference between the frequency of said carrier component and the frequency of the modulation of said first laser beam.

9. The arrangement according to claim 8, further including an optical bandpass filter having a passband that encompasses the frequency range of said variation characteristic, but is less than the beam frequency of said first laser beam, and is operative to remove said carrier component and leave said difference between the frequency of said carrier component and the frequency of the modulation of said first laser beam, so that said optical detector may optically detect the resulting filtered modulated first laser beam.

10. The arrangement according to claim 8, further including a second laser that is operative to generate a second laser beam, said second laser beam being directed upon said optical detector, said optical detector having a frequency sensitivity range that encompasses the frequency range of said variation characteristic, but is less than the beam frequency of said first laser beam, so as to optically heterodyne said second laser beam with said modulated first laser beam, whereby said optical detector produces an output representative of said variation in said difference between the frequency of said carrier component and the frequency of the modulation of said first laser beam.

11. The arrangement according to claim 8, further including a signal generator that is operative to couple a prescribed signal to said first laser for modulating the amplitude of said first laser beam, and a phase detector coupled to said optical detector and said signal generator and being operative to generate an output representative of a difference in phase of said prescribed signal and an output of said optical detector representative of energy contained in said variation in said difference between the frequency of said carrier component and the frequency of the modulation of said first laser beam.

12. The arrangement according to claim 8, further including electrical tap coupled to the modulation drive input of said optical modulator for deriving an output representative of electrical reflection parameters of said modulator.

13. An apparatus for characterizing an optical modulator comprising:
    a tunable laser that is operative to output a first laser beam having a variable laser beam frequency, so that said first laser may be directed upon said optical modulator for modulation thereby;
    an optical modulator controller that is operative to
        i—generate a first signal for application to said modulator to cause said optical modulator to modulate said first laser beam and produce a modulated first laser beam containing a carrier component corresponding to said variable laser beam frequency, and a sideband component corresponding to the difference between the frequency of said carrier component and the frequency of said modulation signal, and
        ii—generate a second signal for application to said tunable laser to cause said variable beam frequency of said tunable laser to be varied simultaneously with variation of said modulation signal, and in accordance with the same variation characteristic thereof, so that said difference between the frequency of said carrier component and the frequency of said modulation signal varies in accordance with said same variation characteristic; and
    an optical detector coupled to receive said first laser beam as modulated by said optical modulator and being operative to detect the variation in said difference between the frequency of said carrier component and the frequency of the modulation of said first laser beam.

14. The apparatus according to claim 13, further including an optical bandpass filter having a passband that encompasses the frequency range of said variation characteristic, but is less than the beam frequency of said first laser beam, and is operative to remove said carrier component and leave said difference between the frequency of said carrier component and the frequency of the modulation of said first laser beam, so that said optical detector may optically detect the filtered modulated first laser beam.

15. The apparatus according to claim 13, further including a second laser that is operative to generate a second laser beam, said second laser beam being directed upon said optical detector, said optical detector having a frequency sensitivity range that encompasses the frequency range of said variation characteristic, but is less than the beam frequency of said first laser beam, so as to optically heterodyne said second laser beam with said modulated first laser beam, whereby said optical detector produces an output representative of said variation in said difference between the frequency of said carrier component and the frequency of the modulation of said first laser beam.

16. The apparatus according to claim 13, further including a signal generator that is operative to couple a prescribed signal to said first laser for modulating the amplitude of said first laser beam, and a phase detector coupled to said optical detector and said signal generator and being operative to generate an output representative of a difference in phase of said prescribed signal and an output of said optical detector representative of energy contained in said variation in said difference between the frequency of said carrier component and the frequency of the modulation of said first laser beam.

17. The apparatus according to claim 13, further including electrical tap coupled to the modulation drive input of said optical modulator for deriving an output representative of electrical reflection parameters of said modulator.

* * * * *

UNITED STATES PATENT AND TRADEMARK OFFICE
CERTIFICATE OF CORRECTION

PATENT NO. : 6,864,986 B2
DATED : March 8, 2005
INVENTOR(S) : Nyman et al.

It is certified that error appears in the above-identified patent and that said Letters Patent is hereby corrected as shown below:

Column 4,
Line 64, "200" should read -- 500 --.

Signed and Sealed this

Eighteenth Day of October, 2005

JON W. DUDAS
*Director of the United States Patent and Trademark Office*